(No Model.) 5 Sheets—Sheet 1.

W. H. DOANE & G. W. BUGBEE.
Sand Papering Machine.

No. 238,095. Patented Feb. 22, 1881.

(No Model.) 5 Sheets—Sheet 2.

W. H. DOANE & G. W. BUGBEE.
Sand Papering Machine.

No. 238,095. Patented Feb. 22, 1881.

(No Model.) 5 Sheets—Sheet 3.

W. H. DOANE & G. W. BUGBEE.
Sand Papering Machine.

No. 238,095. Patented Feb. 22, 1881.

Attest:
H. L. Perrine

Inventor.
William H. Doane
George W. Bugbee
by their attorneys
Gibs & Doolittle (No Model.) 5 Sheets—Sheet 4.
W. H. DOANE & G. W. BUGBEE.
Sand Papering Machine.
No. 238,095. Patented Feb. 22, 1881.
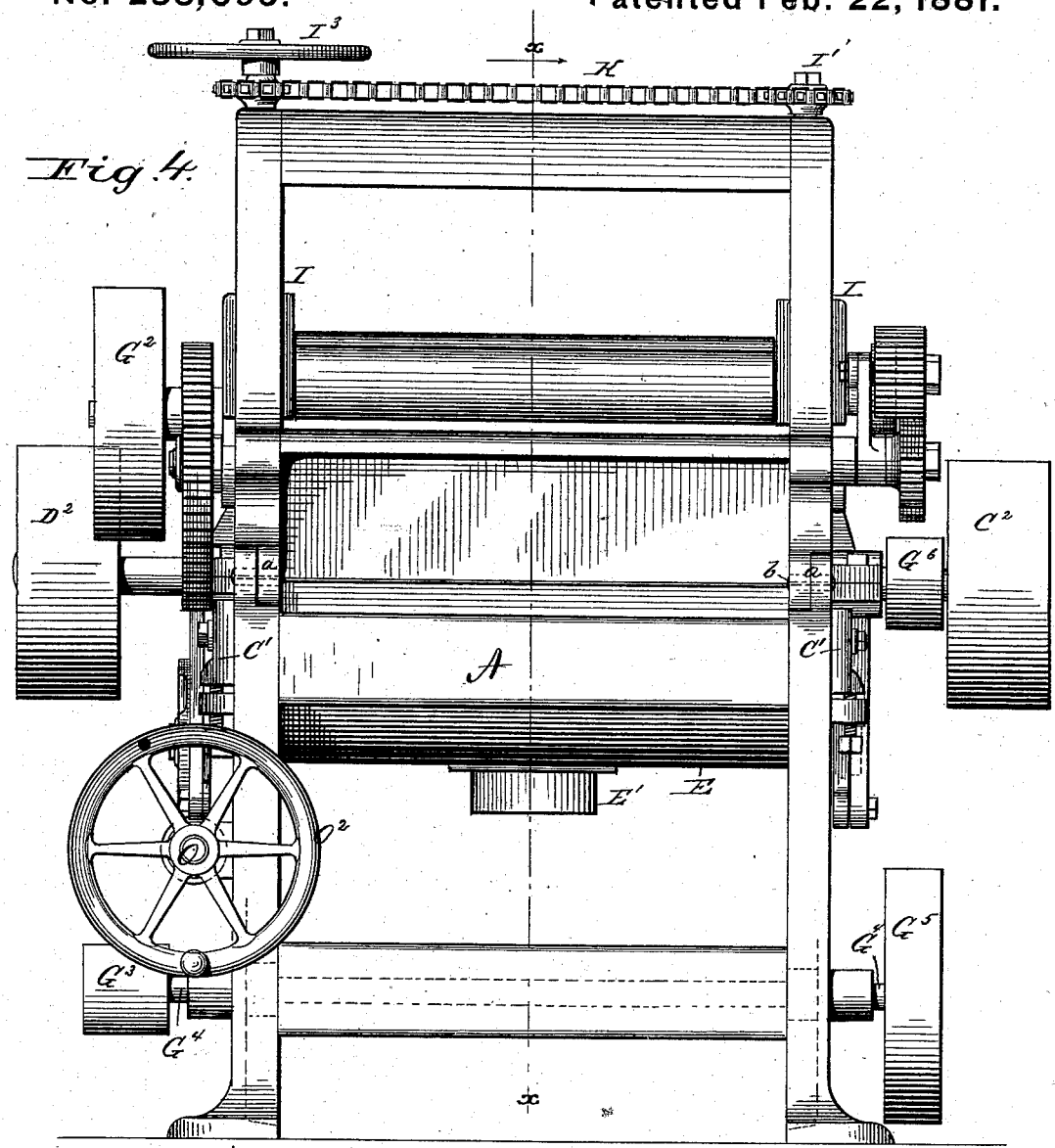
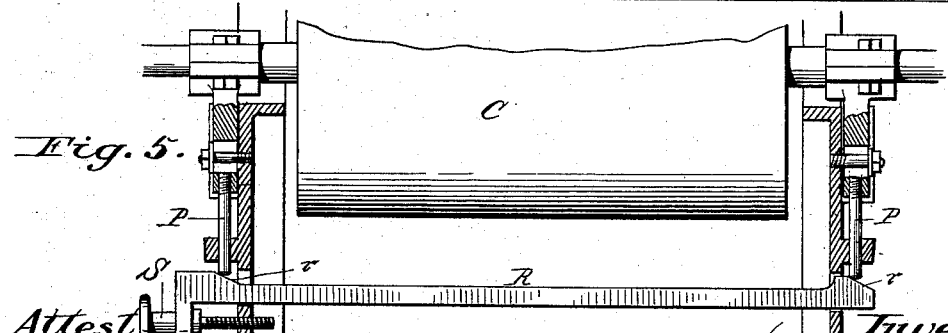

(No Model.) 5 Sheets—Sheet 5.

W. H. DOANE & G. W. BUGBEE.
Sand Papering Machine.

No. 238,095. Patented Feb. 22, 1881.

UNITED STATES PATENT OFFICE.

WILLIAM H. DOANE AND GEORGE W. BUGBEE, OF CINCINNATI, OHIO.

SANDPAPERING-MACHINE.

SPECIFICATION forming part of Letters Patent No. 238,095, dated February 22, 1881.

Application filed June 29, 1880. (No model.)

*To all whom it may concern:*

Be it known that we, WILLIAM H. DOANE and GEORGE W. BUGBEE, both citizens of the United States, residing at Cincinnati, in the county of Hamilton and State of Ohio, have invented certain new and useful Improvements in Double-Drum Sandpapering-Machines; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to machinery for sandpapering wood and other materials for smoothing and polishing purposes.

The improvements are fully set forth in the ensuing detailed description, and are specifically pointed out by the claims at the close of this specification, so that an itemized preliminary recital thereof is unnecessary.

Figure 1:
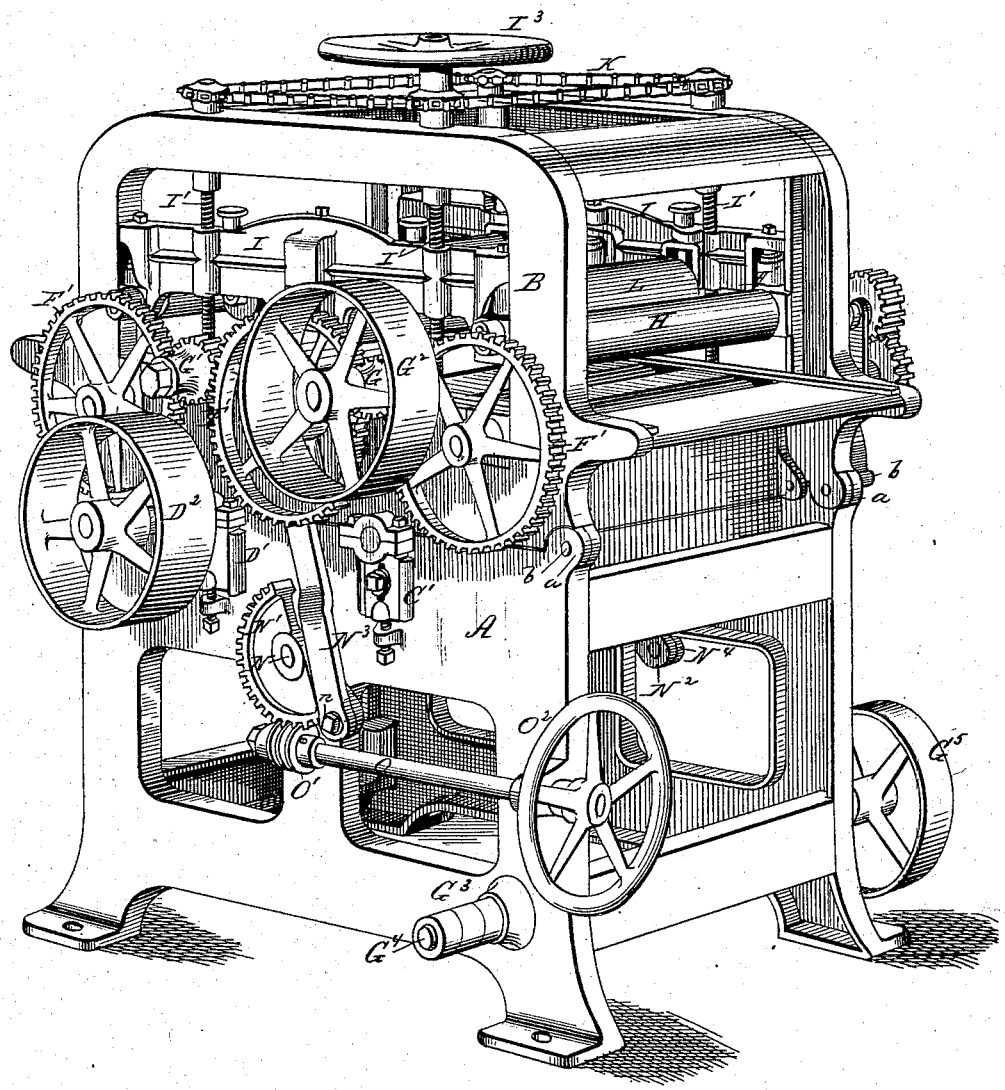
Figure 2:
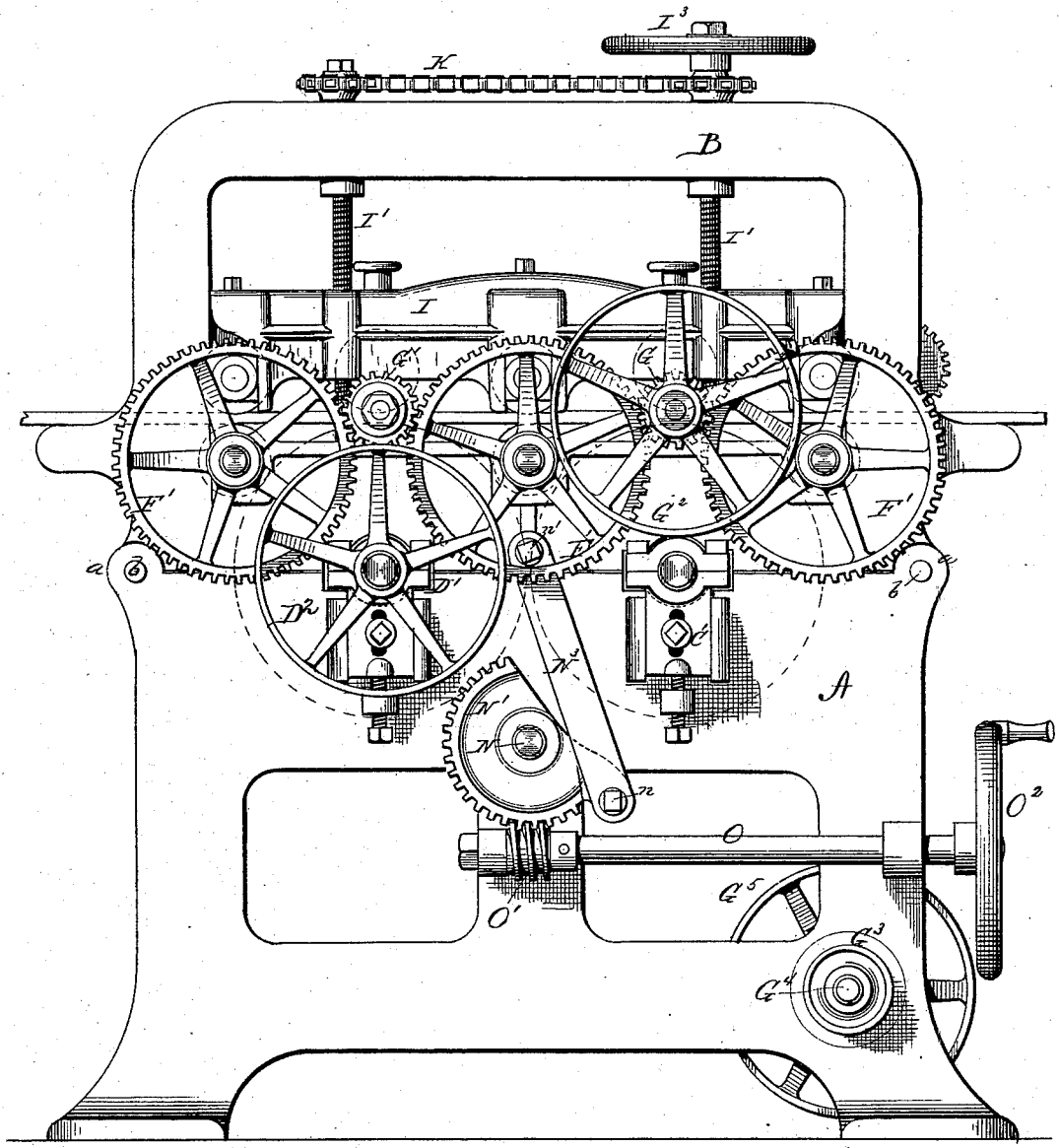
Figure 3:
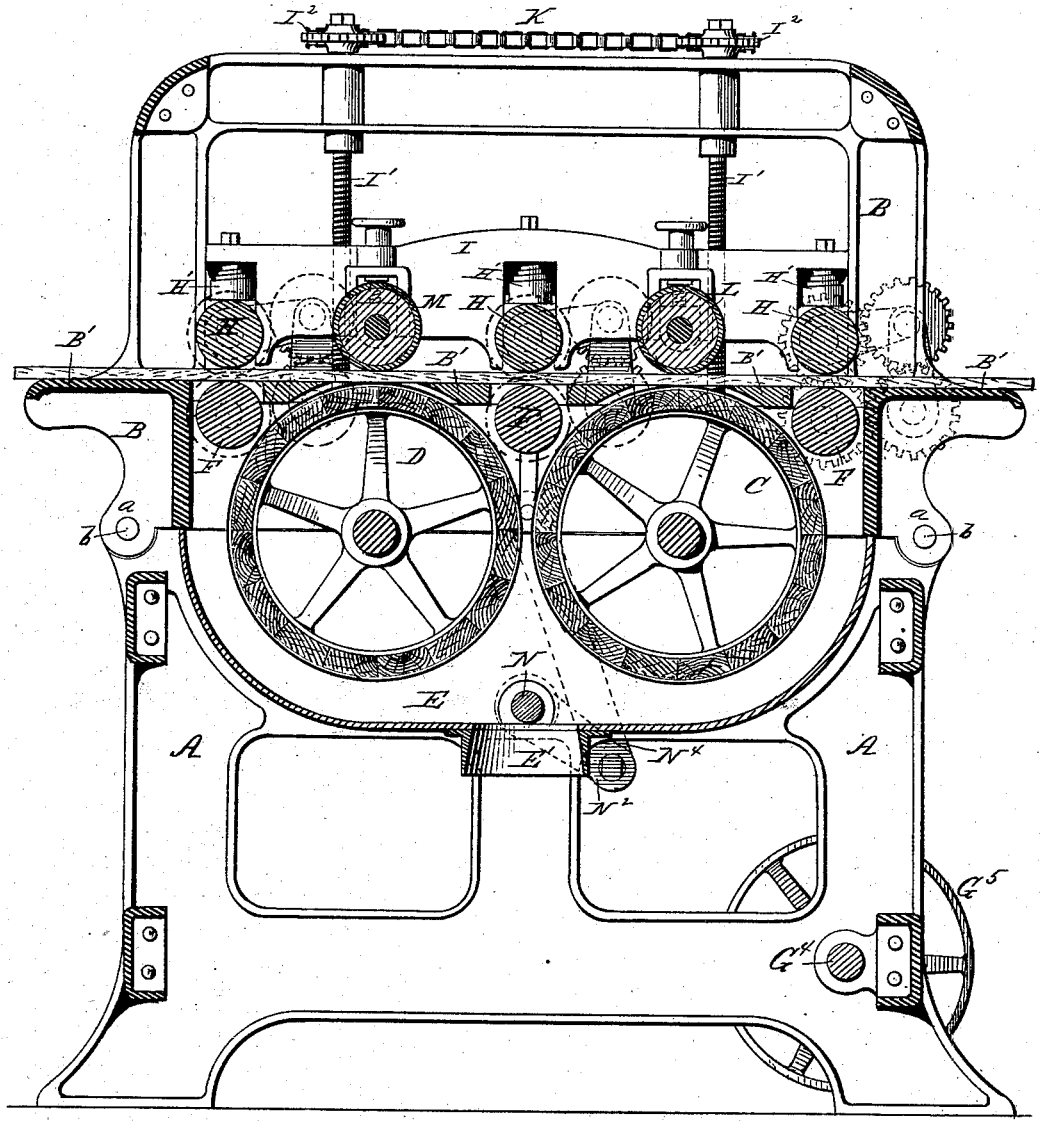
Figure 6:
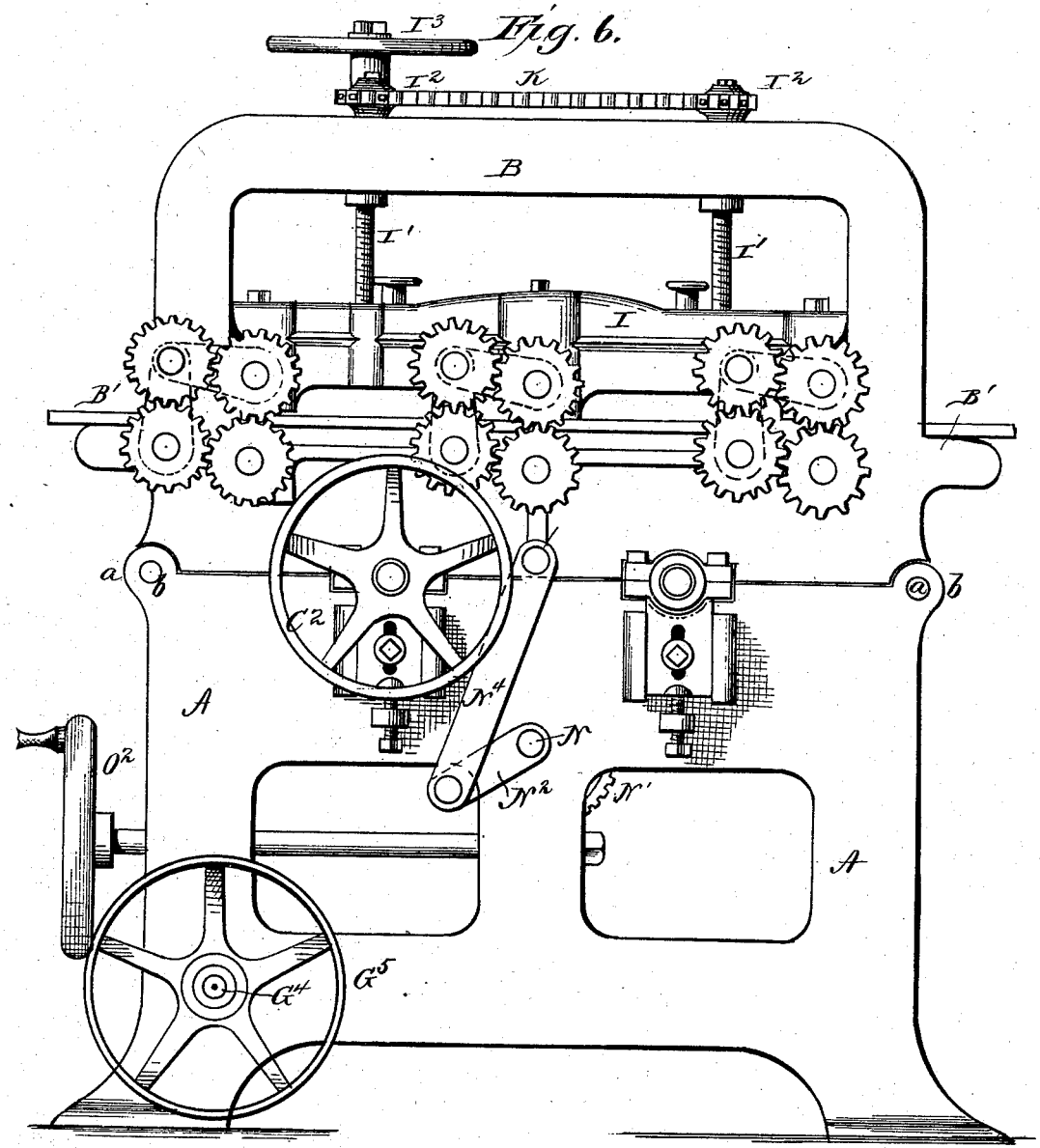

In the annexed drawings, Figure 1 is a perspective view of a sandpapering-machine operating with two sand-paper cylinders. Fig. 2 is a side elevation of the same. Fig. 3 is a vertical section in a plane indicated by line $x\, x$, Fig. 4. Fig. 4 is a front elevation of the machine. Fig. 6 is a side elevation of the machine, showing the side opposite to that shown in Fig. 2.

The same letters of reference are used in all the figures in the designation of identical parts.

The frame-work of the machine consists of two principal parts, namely, the stationary frame A and the movable frame B. The movable frame is mounted upon the stationary frame, the sides of the two frames being pivoted together at both ends, as shown at $a\, a$. The pintles $b$ of the hinge-joints $a$ are all removable, so that on removing the pintles from the hinge-joints at either end the movable frame may be tilted up by turning it on the pintles at the other end.

C and D refer to two sand-paper cylinders mounted side by side across the frame-work and journaled in bearings C′ D′, respectively, on the stationary frame A. The bearings C′ and D′ are so arranged on the stationary frame that they may be vertically adjusted to a limited extent in order to properly regulate the planes of rotation of the sand-paper cylinders.

A concave or dust-pan, E, extends from side to side of the stationary frame beneath and at the sides of the sand-paper cylinders to receive the dust caused by the sandpapering. The dust-pan is provided with a nozzle, E′, for the attachment of a pipe or tube leading to an exhaust-pan used for discharging the dust.

The sand-paper cylinder C has an extended journal on the right-hand side of the machine carrying a pulley, $C^2$, for driving said cylinder by a belt. The sand-paper cylinder D has a similarly-extended journal on the left-hand side of the machine, carrying a pulley, $D^2$, for driving said cylinder by a belt. The sand-paper cylinders may be of any well-known construction, and should have a somewhat elastic or yielding surface as a backing for the sand-paper, which may be applied and secured in any known or preferred manner. The cylinder C at the front end of the machine is provided with coarser sand-paper than the cylinder D at the rear end of the machine, so that a board passed through the machine may be smoothed by the cylinder C and then polished by the cylinder D.

The movable frame is constructed with a number of cross-bars, B′ B′, the upper surfaces of which are all in the same horizontal plane, and which constitute the table or platen of the machine, having the required transverse openings through which the sand-paper cylinders and lower feed-rolls can operate upon the lower surface of the board. Underneath this slotted table the movable frame has a box-like projection meeting the top of the stationary frame and the ends of the dust-pan E, as shown best in Fig. 3.

Three sets of feed-rollers are used, arranged, respectively, the first set in front of the cylinder C, the second set between the cylinders C and D, and the third set in rear of the cylinder D. The fixed rollers F of these three sets of feed-rolls are journaled in boxes of the movable frame so as to operate through the slots in the table upon the lower surface of the board. Some little adjustment should be provided for in the mounting of the boxes of these fixed rolls in order that they may be properly adjusted with reference to the sand-paper cylinders and the top of the table. The journals of these fixed rolls on the left-hand side of the machine extend through their bearings, and the journal of each roll carries a spur-wheel, F'. These spur-wheels are rotated to drive the rolls by means of the driving-pinion G and the idler-pinion G' of equal size and suitably mounted to engage the spur-wheels F'. The shaft or axle of the driving-pinion G carries a pulley, $G^2$, adapted to be driven by a belt from a pulley, $G^3$, on a countershaft, $G^4$, mounted on the stationary frame, and carrying a pulley, $G^5$, adapted to be driven through a belt by a pulley, $G^6$, on the elongated journal of the sand-paper cylinder C. The movable rolls H of these three sets of feed-rolls are journaled in boxes at each end supported in vertically-adjustable housings I I. These housings are fitted to slide on vertical guide-bars formed on the movable frame above the table, each housing being supported by two screws, I' I', swiveled in the string-bars which connect the web of the guide-bars of the movable frame. Each one of the four supporting-screws I' of the housings carries at its upper end a sprocket-wheel, $I^2$, and one of them carries in addition thereto a hand-wheel, $I^3$. An endless linked drive-chain, K, passes around the four sprocket-wheels, so that by operating hand-wheel $I^3$ all the adjusting-screws I' will be turned simultaneously. The sprocket-wheels being all of the same size, it follows that the adjusting-screws will be turned to an equal extent, so as to elevate or depress the housings exactly alike at both ends. The journal-boxes of the feed-rolls H are seated against springs H', so as to give the rolls the usual yielding or elastic character. The movable feed-rolls are driven by the fixed feed-rolls through means of the well-known expansion-gearing applied at the right-hand side of the machine, as shown best in Figs. 3 and 4. The adjustable housings I also support the two pressure-rolls L and M, arranged, respectively, vertically above the sand-paper cylinders C and D. These pressure-rolls are journaled in boxes fitted in the housings I, and controlled by adjusting-screws, which provide for a limited vertical adjustment of said pressure-rolls, as usual.

It will be observed that the movable frame carries the entire feed and pressure mechanism for both sand-paper cylinders, so that the tilting up of the movable frame at one end provides for ready and unobstructed access to the sand-paper cylinder at that end of the machine, and the tilting up of the movable frame at the other end provides for similar access to the other sand-paper cylinder, so that the cylinders may be conveniently covered with fresh sand-paper as often as required without necessitating any removal or replacement of parts except the pintles b.

Since the movable frame and its appurtenances are quite heavy it is expedient to provide mechanism for operating the movable frame in tilting and lowering it. To this end a shaft, N, is mounted about midway of the stationary frame, extending across the same, and carrying at one end a toothed segment or pinion, N', and at the other end an arm or crank, $N^2$. Connecting-rods $N^3$ $N^4$ connect the crank $N^2$ and a wrist-pin, n, on the toothed segment N' with wrist-pins or studs n fixed on the movable frame about midway of its length. The toothed segment or pinion N' is in gear with a worm, O', formed or fixed on a shaft, O, mounted on the stationary frame and carrying at its front end a hand-wheel, $O^2$. The worm-gearing will hold the movable frame in its tilted position without additional props or stays.

Fig. 5 illustrates a modification of the means for vertically adjusting the sand-paper cylinders, whereby both ends of the cylinder can be moved simultaneously to an equal extent. The mechanism is shown as applied to the sand-paper cylinder C. The respective bearings are provided with downwardly-projecting rods P, which stand on inclines r r on the respective ends of the slide-bar R mounted in the sides of the stationary frame. The slide-bar is controlled by an adjusting-screw, S, swiveled in an ear of the bar and turning in a tap in the frame.

We make no claim herein for the modification shown in Fig. 5, providing for the simultaneous vertical adjustment of both ends of the sand-paper cylinders, as that feature will be included in a separate application.

Instead of pressure-rollers pressure-bars, their well-known equivalent, might be used; but we prefer to employ pressure-rollers.

The sand-paper cylinders occupy the center of the frame and are arranged in close proximity to each other. They are equidistant from the ends of the frame in order to approximately balance the machine. This balance is measurably preserved when the machine is running, since the power for driving the sand-paper cylinders is divided, one-half being alloted to the right-hand side of the machine and the other half to the left-hand side of the machine.

Having thus described our invention, what we claim as new is—

1. The combination of the smoothing sand-paper cylinder, the polishing sand-paper cylinder parallel therewith, a pressure-roller or bar over each cylinder, and three sets of feed-rolls parallel with the sand-paper cylinders.

2. In a sandpapering-machine, the combination of one or more sand-paper cylinders adjustably mounted in the lower stationary frame and the bed-plates and pressure bars or rollers mounted in the upper frame above said cylinders, substantially as before set forth.

3. In a sandpapering-machine, the combination of the sand-paper cylinders, the pressure bars or rollers and upper power-driven feed-rollers above said cylinders, and the adjustable housings for said rollers, substantially as before set forth.

4. In a sandpapering-machine, the combination of the sand-paper cylinders, the pressure bars or rollers and upper power-driven feed-rollers above said cylinders, the adjustable housings for said rollers, and the intergeared screws for simultaneously adjusting the housings.

5. In a sandpapering-machine, the combination of the sand-paper cylinders, the upper train of feed-rollers and pressure rollers or bars, and means for simultaneous as well as independent adjustment of said rollers, substantially as before set forth.

6. In a sandpapering-machine, the combination of the sand-paper cylinder or cylinders mounted adjustably in the lower stationary frame, the bed-plate and feed-rollers and pressure rollers or bars mounted on the upper frame, the upper train of feed-rollers and pressure-rollers being carried by adjustable housings of the upper frame, substantially as before set forth.

7. In a sandpapering-machine, the combination of the sand-paper cylinder or cylinders mounted on the lower stationary frame, and the feed-rollers and pressure rollers or bars mounted on the upper frame, which is hinged to the lower frame, substantially as before set forth.

8. In a sandpapering-machine, the combination of two sand-paper cylinders mounted in the same horizontal plane, in close proximity to each other, equidistant from the respective ends of the frame, and driven at opposite ends, substantially as before set forth.

9. The combination, substantially as before set forth, of the movable feed-rolls, the pressure rolls or bars, the adjustable housings for all said rolls, the adjusting-screws for the housings provided with sprocket-wheels, and the endless link-chain for simultaneously operating all the adjusting-screws.

10. The combination, substantially as before set forth, of the stationary frame carrying the sand-paper cylinders, the movable frame carrying the feed and pressure mechanism, and the removable pintles for connecting the movable frame at both ends to the stationary frame.

11. The combination, substantially as before set forth, of the stationary frame, the movable frame, the removable pintles for hinging the movable frame at both ends to the stationary frame, and the worm-gearing, together with shafts and connecting-rods for tilting the movable frame up from either end.

In testimony whereof we affix our signatures in presence of two witnesses.

W. H. DOANE.
G. W. BUGBEE.

Witnesses:
  CHAS. G. JONES,
  ALBERT N. SPENCER.